United States Patent
Sen (10) Patent No.: US 8,359,379 B1
(45) Date of Patent: Jan. 22, 2013

(54) METHOD OF IMPLEMENTING IP-BASED PROXY SERVER FOR ISCSI SERVICES

(75) Inventor: Subhabrata Sen, Karimganj (IN)

(73) Assignee: NetApp, Inc., Sunnyvale, CA (US)

( * ) Notice: Subject to any disclaimer, the term of this patent is extended or adjusted under 35 U.S.C. 154(b) by 1089 days.

(21) Appl. No.: 12/112,745

(22) Filed: Apr. 30, 2008

(51) Int. Cl.
*G06F 15/173* (2006.01)
*G06F 15/16* (2006.01)

(52) U.S. Cl. ........ 709/223; 709/230; 709/238; 709/245; 709/249

(58) Field of Classification Search .................. 709/223, 709/230, 238, 245, 249
See application file for complete search history.

(56) References Cited

U.S. PATENT DOCUMENTS

| | | | | |
|---|---|---|---|---|
| 5,793,763 A * | 8/1998 | Mayes et al. | ................ | 370/389 |
| 6,400,730 B1 * | 6/2002 | Latif et al. | ................ | 370/466 |
| 6,510,154 B1 * | 1/2003 | Mayes et al. | ................ | 370/389 |
| 6,748,439 B1 * | 6/2004 | Monachello et al. | ........ | 709/229 |
| 6,888,837 B1 * | 5/2005 | Cunningham et al. | ....... | 370/401 |
| 6,892,245 B1 * | 5/2005 | Crump et al. | ................ | 709/245 |
| 7,113,508 B1 * | 9/2006 | Mayes et al. | ................ | 370/389 |
| 7,136,385 B2 * | 11/2006 | Damon et al. | ........... | 370/395.31 |
| 7,325,075 B1 * | 1/2008 | Chiu et al. | ................ | 709/245 |
| 7,583,668 B1 * | 9/2009 | Mayes et al. | ................ | 370/389 |
| 7,633,955 B1 * | 12/2009 | Saraiya et al. | ............. | 370/401 |
| 8,108,554 B1 * | 1/2012 | Masters | ...................... | 709/245 |
| 2003/0140193 A1 * | 7/2003 | Acharya et al. | ............. | 711/112 |
| 2003/0202510 A1 * | 10/2003 | Witkowski et al. | ........ | 370/386 |
| 2008/0159260 A1 * | 7/2008 | Vobbilisetty et al. | ....... | 370/351 |

* cited by examiner

*Primary Examiner* — David Lazaro
*Assistant Examiner* — Farzana Huq
(74) *Attorney, Agent, or Firm* — Perkins Coie LLP (57) ABSTRACT

A facility for impersonating a number of iSCSI initiators within a IP-based Storage Area Network (SAN) is provided. In some embodiments, the facility receives iSCSI PDUs from a plurality of iSCSI devices. Each iSCSI PDU includes a SCSI command, an IP address of the initiator from which it was received, and an indication of a target storage device to which the iSCSI PDU is addressed. The facility maps IP address of the initiator from which the iSCSI PDU was received to a globally unique IP address and sends the iSCSI PDU to the indicated target storage device. When a response to the iSCSI PDU is received, the facility maps the globally unique IP address to the IP address of the initiator from which the iSCSI PDU was received and forwards the response to the initiator. In some embodiments, the facility is transparent to the iSCSI initiators.

24 Claims, 9 Drawing Sheets

| Host | Host IP Address | Host TCP Port Number | Proxy Initiator IP Address | Assigned TCP Port Number |
|---|---|---|---|---|
| 205a | 10.42.1.70 | 400 | 192.168.32.10 | 1 |
| 205b | 10.42.1.73 | 8 | 192.168.32.10 | 2 |
| ... | ... | ... | ... | ... |
| 205n | 10.42.1.92 | 56 | 192.168.32.10 | 90 |

METHOD OF IMPLEMENTING IP-BASED PROXY SERVER FOR ISCSI SERVICES

FIELD OF THE INVENTION

At least one embodiment of the present invention pertains to storage systems, and more particularly, to a method and apparatus to extend the iSCSI protocol to provide an IP-based proxy service.

BACKGROUND

Businesses today generate and maintain enormous volumes of data. As a result, storage is no longer an afterthought; instead, it is a strategic investment priority for businesses of all sizes. In fact, businesses are searching for more ways to efficiently manage their expanding volumes of data, and to make such data accessible throughout the enterprise. This trend is propelling the move of storage into the network and, importantly, increasing businesses' attraction to storage service providers. A Storage Service Provider (SSP) is a company that provides data storage space and related management services (e.g., periodic backup and archiving).

Storage Service Providers (SSPs) offer a variety of storage systems. Storage systems are commonly deployed within a storage area network (SAN) or a network attached storage (NAS) environment. In a NAS configuration, a storage server is implemented in the form of an appliance that attaches to a network. NAS systems generally utilize file-based access protocols; therefore, each client may request the services of the storage system by issuing file system protocol messages to the file system over the network.

A SAN is a high-speed network that enables establishment of direct connections between a storage system and its storage devices. With SAN, clients' requests are specified in terms of blocks, rather than files. Conceptually, a SAN may be viewed as an extension to a storage bus that enables access to stored information using block-based access protocols over the "extended bus." In this context, the extended bus is typically embodied as Fiber Channel or Ethernet media adapted to operate with block access protocols. Thus, a SAN arrangement allows decoupling of storage from the storage system, such as an application server, and placing of that storage on a network.

Today, Fibre Channel is the predominant architecture upon which SAN implementations are built. Fibre Channel is a technology standard that allows data to be transferred from one network device to another at extremely high speeds. However, because dedicated cabling is currently required to implement a Fibre Channel SAN, it cannot run over a public IP-based network.

To form a geographically distributed SAN, a mapping layer can be used, such as to map SCSI over Fibre Channel Protocol (FCP) over IP (FCIP) or to map SCSI over TCP/IP (iSCSI). Internet SCSI (iSCSI) is a data storage networking protocol that transports SCSI commands over the standard TCP/IP networking technology (e.g., the Internet). One difference between FCIP and iSCSI is that iSCSI takes raw SCSI commands and encapsulates the commands into IP packets, whereas FCIP requires that the SCSI commands first be encapsulated into FCP frames before the FCP frames are encapsulated into IP packets. This encapsulation adds additional processing and bandwidth overhead, so FCIP compares poorly to iSCSI as a standalone method of transferring data through an IP-based network.

Compared to a Fibre Channel installation, iSCSI is inexpensive and there are no distance limitations (i.e., Fibre Channel range limit is about 10 km using single-mode fiber). Also, iSCSI can be implemented within any storage server that includes a network connection and a TCP/IP stack; whereas, with Fibre Channel, storage servers require a dedicated SCSI adapter, which is more expensive than an off-the-shelf Ethernet Network Interface Card (NIC).

Because storage management is complex, it is understandable why, as storage concerns have taken precedence for many businesses, SSPs have grown increasingly more attractive as a solution to physically outsource data storage. However, there are presently a number of disadvantages associated with enterprise adoption of a pure IP-based SAN (iSCSI) model. For example, with iSCSI, a public (static) IP address must be assigned to each host that connects to the SSP, and the number of public IP addresses is scarce. As another example, SSPs generally license their services and applications based on the number of hosts connecting to the storage system. Typically, many (if not all) storage servers (i.e., iSCSI hosts) in an enterprise will need to connect to the storage system. Thus, under the current model, businesses are discouraged by escalating licensing costs from adopting a pure IP-based SAN implementation.

BRIEF DESCRIPTION OF THE DRAWINGS

One or more embodiments of the facility are illustrated by way of example and not limitation in the figures of the accompanying drawings, in which like references indicate similar elements and in which.

DETAILED DESCRIPTION

The technology introduced herein includes an innovative way of reducing the number of public IP addresses required for a number ("n") of hosts to access a storage system over a public IP-based network, thereby reducing the licensing costs associated with connection-based licensing often charged by storage service providers (SSPs). The technology also extends the iSCSI protocol in a way that enables centralized management of pure IP-based SANs. It is noted that the present technology is not necessarily limited to the iSCSI protocol or to SAN environments; rather, these are just discussed as examples.

The technology introduced herein includes a receive unit and an impersonation unit. The receive unit receives datagrams from a numbers of iSCSI initiators. For each received datagram, the impersonation unit maps the IP address from which the datagram was received to a globally unique IP address associated with a proxy device. The translated datagram is then sent to an iSCSI target for further processing. By mapping the iSCSI initiators' IP addresses to a globally unique IP address, the facility reduces the number of public IP addresses necessary for the iSCSI initiators to access a target storage system over a public IP-based network.

Figure 1A:
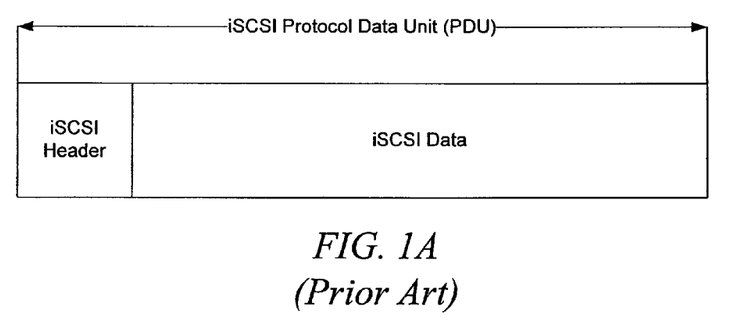
FIG. 1A is a high-level block diagram of an iSCSI Protocol Data Unit (PDU).
Figure 1B:
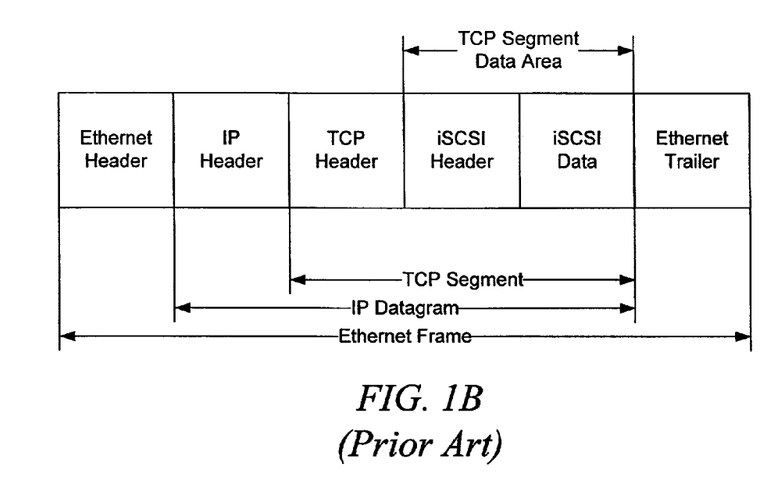
FIG. 1B is a high-level block diagram of a TCP Segment Data Area of an Ethernet Frame including an iSCSI PDU.

The architecture of iSCSI is outlined in IETF RFC 3720, "Internet Small Computer Systems Interface (iSCSI)" (April 2004). Every iSCSI link involves a host, called an iSCSI initiator, and a storage device, called an iSCSI target. The iSCSI protocol is conceptually similar to the TCP/IP client/server architecture. The iSCSI initiator acts as a client, and the iSCSI target as a server. iSCSI initiators and iSCSI targets communicate by exchanging iSCSI Protocol Data Units (PDUs). As shown in FIG. 1A, an iSCSI PDU has a header and an optional data section. As shown in FIG. 1B, iSCSI PDUs are transported in the TCP segment data area of Ethernet frames (referred to herein as "iSCSI datagrams" or simply "datagrams"). Thus, the initiator's iSCSI stack packs SCSI commands and data into IP packets, which are then unpacked by the target for processing as if they had originated locally.

In some embodiments, the technology introduced herein is described as a hardware and/or software facility that includes a receive unit and an impersonation unit. The receive unit receives iSCSI datagrams from a numbers of iSCSI initiators. Each datagram includes one or more encapsulated SCSI commands, a local IP address corresponding to the iSCSI initiator from which the datagram was received, and an indication of an iSCSI target to which the datagram is addressed. The impersonation unit maps the local address to a globally unique IP address associated with the facility, and sends the datagram to the iSCSI target to which the datagram is addressed. By mapping the iSCSI initiators' IP addresses to a globally unique IP address, the facility reduces the number of public IP addresses necessary for the iSCSI initiators to access a storage system over an IP-based network. The facility may also reduce the licensing costs for accessing the storage system, if the SSP implements a connection-based licensing system.

In some embodiments, the facility is implemented within as a daemon within a proxy device (sometimes referred to herein as a proxy initiator). The proxy initiator may perform other functions not mentioned here, in addition to those performed by the facility introduced herein. In some embodiments, the proxy initiator is an iSCSI initiator that, like the other iSCSI initiators, generates SCSI commands directed to one or more iSCSI targets. In some embodiments, the iSCSI initiators each execute an iSCSI driver that includes an option introduced herein to use the proxy initiator. If enabled, the option results in the iSCSI initiator sending its datagrams to the proxy initiator, which sends the datagrams on to the iSCSI target for processing as if the datagrams were generated by the proxy initiator. When this option is disabled, the iSCSI initiator sends its datagrams directly to the iSCSI target. In some embodiments, the option is enabled for each iSCSI initiator except the proxy initiator.

Figure 2:
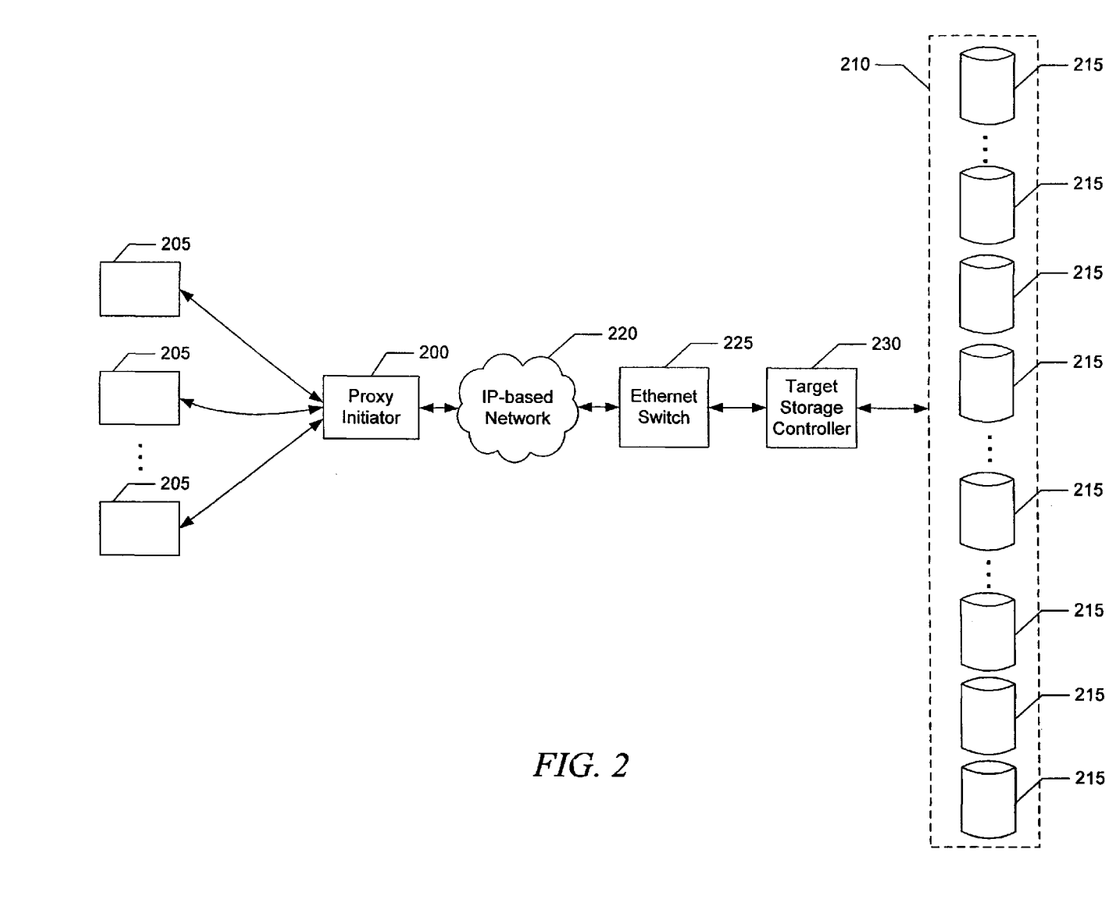
FIG. 2 is a high-level data flow diagram of various components or services that are part of or interact with a storage network.

Before considering the facility introduced herein in greater detail, it is useful to consider an environment in which the facility can be implemented. FIG. 2 is a data flow diagram of various components or services that are part of or interact with a storage network. In some embodiment, an iSCSI proxy initiator 200 (referred to herein as a "proxy initiator") is connected to a plurality of hosts 205 through a private IP-based network (not shown) and to a target storage controller (iSCSI target) 230 through a public IP-based network 220. The iSCSI target 230 is directly responsible for managing data storage on multiple mass storage devices 215 in target storage system 210 and enables access to those devices. In some embodiments, the facility includes more than one iSCSI target 230, even though it is not illustrated as such in FIG. 2. The iSCSI target 230 can be, for example, a storage server capable of serving block-level client requests. Importantly, the facility introduced herein enables a pure IP-based SAN (iSCSI) to be implemented without the disadvantages described above.

Moreover, unlike conventional SANs, which implement either pure-FCP or a combination of SAN protocols (e.g., FCP and iSCSI), the facility does not require dedicated cabling or specialized hardware—it can run over the existing IP infrastructure. Each host 205 includes a software initiator implementing the iSCSI protocol. Typically, this is found in a kernel-resident device driver that uses the existing Network Interface Card (NIC) and network stack to emulate SCSI devices for the host 205.

As shown in FIG. 2, the hosts 205 send SCSI commands encapsulated within one or more IP packets (iSCSI datagrams) to the proxy initiator 200, which forwards the commands across the network 220 to an Ethernet switch 225. The Ethernet switch 225 then routes the commands to the target storage controller 230 where the commands are unpacked for processing as if commands had originated locally at the target storage controller 230. Details regarding iSCSI commands are known and well documented, and thus need not be described in detail in order to gain an understanding of the concepts and operation of the facility introduced herein. The hosts 205 may be block-based servers, file-based servers used in a Network Attached Storage (NAS) mode, servers that can do both, or a combination of server types.

The target storage system 210 is accessed by the target storage controller 230, which in some embodiments accesses target storage system 210 in response to various block-based transaction requests (e.g., read, write, etc.) generated by hosts 205. The mass storage devices 215 in the storage subsystem 210 may be, for example, magnetic disks, optical disks such as CD-ROM or DVD based storage, magneto-optical (MO) storage, or any other type of non-volatile storage devices suitable for storing large quantities of data. The storage devices 215 in target storage subsystem 210 can be organized as a Redundant Array of Inexpensive Disks (RAID), in which case the target storage controller accesses the storage system 210 using one or more well-known RAID protocols.

In some embodiments, the proxy initiator 200 uses Network Address Translation (NAT) to impersonate the plurality of hosts 205. Unlike prior pure IP-based SANs, the facility introduced herein therefore does not require a public IP address for every host 205. Also, because the proxy initiator 200 impersonates the hosts 205, the license charged by a SSP for access to its storage system 210 is reduced from the number of hosts ("n") to one (or the number of proxy initiators 200 accessing the storage system 210). Thus, the facility introduced herein overcomes traditional disadvantages associated with the adoption of a pure iSCSI model.

Moreover, unlike prior pure IP-based SANs which lack any centralized control, the facility introduced herein enables storage administrators to centrally manage incoming and outgoing iSCSI traffic (by using proxy initiator 200). In some embodiments, the facility generates a report describing the incoming and/or outgoing iSCSI traffic. Reports may be generated on a sporadic basis, on a periodic basis, when a threshold number of iSCSI datagrams is reached, during periods of low activity, in response to any predefined event, and so forth. A systems administrator, for example, may use such a report to determine how to distribute processing and communications evenly across the hosts 205 and/or the target storage controllers 230 so that no single device is overwhelmed. As another example, the proxy initiator 200 may further provide access control by restricting (or allowing) iSCSI PDUs from particular host IP addresses directed towards particular target storage controller 230.

In some embodiments, the facility introduced herein is implemented within the proxy initiator 200, or in other devices. For example, the facility can be adapted for use in other types of storage systems that provide hosts with access to stored data or storage systems other than SANs. While various embodiments are described in terms of the environment described above, those skilled in the art will appreciate that the facility may be implemented in a variety of other environments including a single, monolithic computer system, as well as various other combinations of computer systems or similar devices connected in various ways. For example, in some embodiments, the proxy initiator 200 has a distributed architecture, even though it is not illustrated as such in FIG. 2.

Figure 3A:
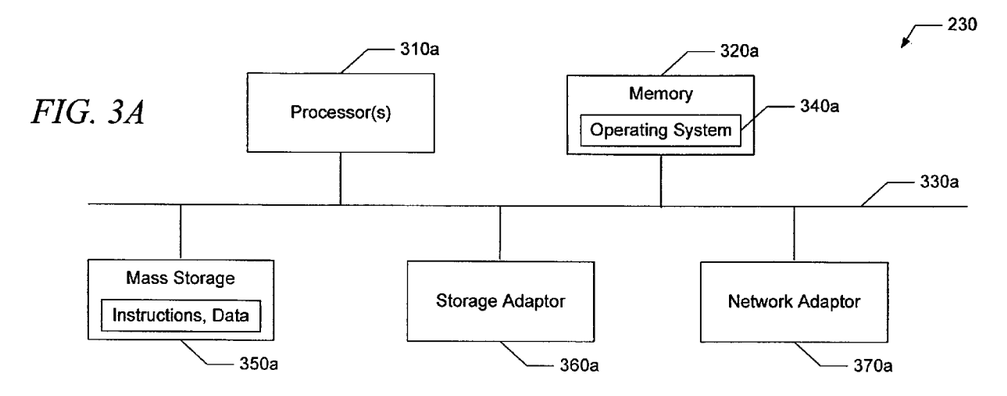
FIGS. 3A and 3B are high-level block diagrams of processing systems that may be used to implement a target storage controller and an iSCSI proxy initiator, in some embodiments.
Figure 3B:
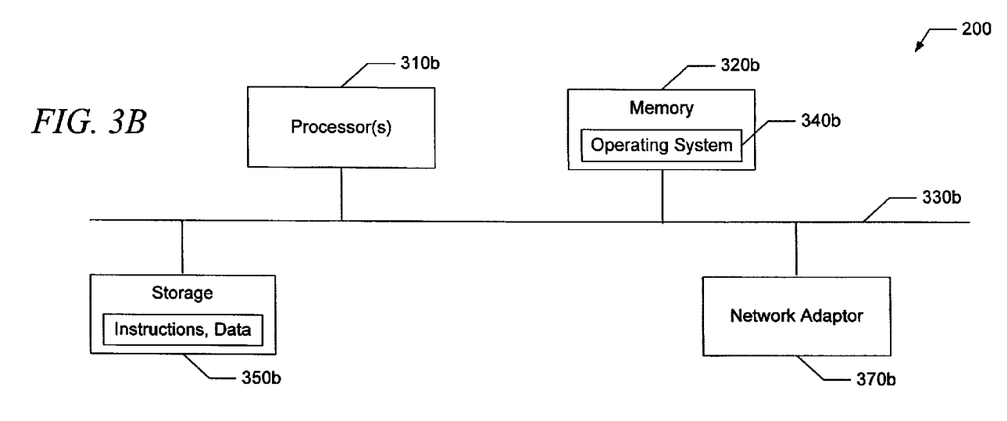

FIGS. 3A and 3B are high-level block diagrams of processing systems that may be used to implement the target storage controller 230 and the proxy initiator 200, respectively. Certain well-known structures and functions have not been shown or described in detail to avoid obscuring the description. Those skilled in the art will understand that the processing systems shown in FIGS. 3A and 3B may be altered in a variety of ways. For example, in some embodiments, the proxy initiator 200 includes storage adaptor 360b, even though it is not illustrated as such in FIG. 3B. Those skilled in the art will appreciate that the proxy initiator 200 may also function as a host 205. Unlike hosts 205, however, proxy initiator 200 executes an iSCSI daemon 435, as described below. Thus, a processing system with an architecture such as illustrated in FIG. 3B may also be used to implement a host 205.

As shown in FIG. 3A, the target storage controller 230 includes one or more processors 310a and memory 320a coupled to an interconnect system 330a. The interconnect systems 330a and 330b shown in FIGS. 3A and 3B are abstractions that represent any one or more separate physical buses and/or point-to-point connections, connected by appropriate bridges, adapters and/or controllers. The interconnect systems 330a and 330b, therefore, may include, for example, a system bus, a form of Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processors 310a are the central processing units (CPUs) of the target storage controller 230 and, thus, control its overall operation. In some embodiments, the processors 310 accomplish this by executing software stored in memory 320a. The processors 310a and 310b, shown in FIGS. 3A and 3B respectively, may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 320a includes the main memory of the target storage controller 230. Memory 320a and 320b, shown in FIGS. 3A and 3B respectively, represents any form of random access memory (RAM), read-only memory (ROM), flash memory, or the like, or a combination of such devices. Memory 320a stores (among other things) the operating system 340a of the target storage controller 230.

Also connected to the processors 310a through the interconnect system 330a are one or more mass internal storage devices 350a, a storage adapter 360a, and a network adapter 370a. Internal mass storage devices 350a and 350b, shown in FIGS. 3A and 3B respectively, may be or include any conventional medium for storing large volumes of data in a non-volatile manner, such as one or more magnetic or optical based disks. The storage adapter 360a allows the target storage controller 230 to access the target storage system 210 and may be, for example, a Fiber Channel adapter or a SCSI adapter. The network adapter 370a allows the target storage controller 230 to communicate with devices, such as the proxy initiator 200, over a network and may be, for example, an Ethernet adapter or the like.

As shown in FIG. 3B, the proxy initiator 200 includes one or more processors 310b and memory 320b coupled to an interconnect system 330b. The processors 310b are the central processing units (CPUs) of the proxy initiator 200 and, thus, control its overall operation. In some embodiments, the processors 310b accomplish this by executing software stored in memory 320b. Memory 320b includes the main memory of the proxy initiator 200, and stores (among other things) the operating system 340b of the proxy initiator 200.

Also connected to the processors 310b through the interconnect system 330b are one or more internal mass storage devices 350b and a network adapter 370b. The network adapter 370b allows the proxy initiator 200 to communicate with devices, such as the target storage controller 230 and the hosts 205, over a network and may be, for example, an Ethernet adapter or the like.

Figure 4A:
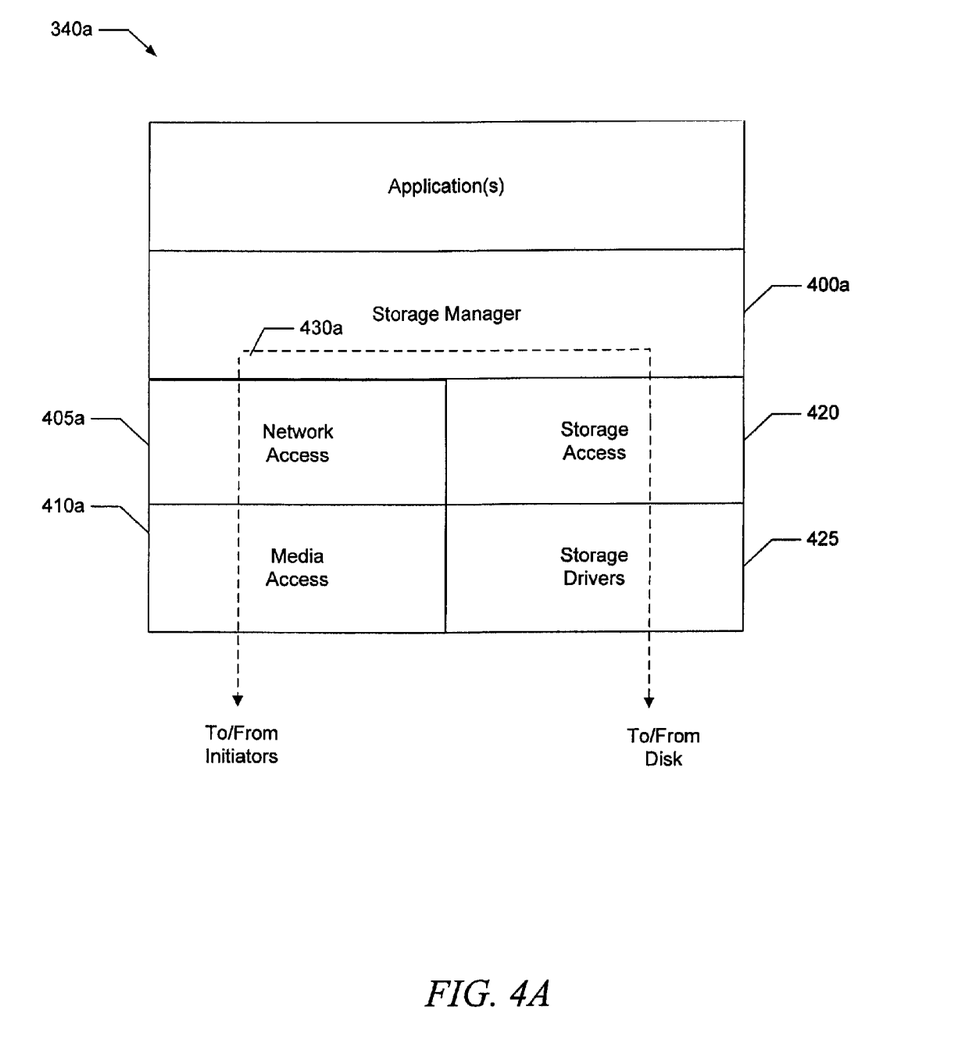
FIG. 4A is a high-level block diagram showing an example of an operating system of a target storage controller.
Figure 4B:
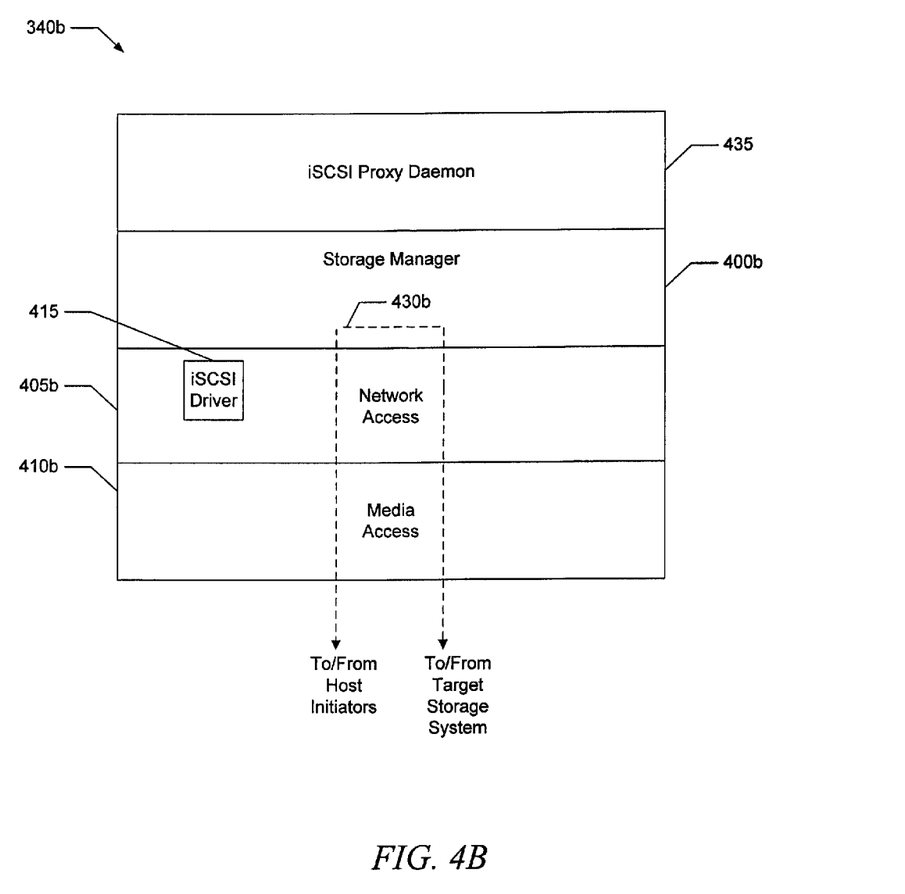
FIG. 4B is a high-level block diagram showing an example of an operating system of an iSCSI proxy initiator.

FIG. 4A is a high-level block diagram showing an example of an operating system 340a of the target storage controller 230. FIG. 4B is a high-level block diagram showing an example of an operating system 340b of the proxy initiator 200. Operating systems 340a and 340b may be, for example, the NetApp™ Data ONTAP™ operating system available from NetApp, Inc., of Sunnyvale, Calif. that implements the Write Anywhere File Layout (WAFL™) file system is an example of such a storage operating system implemented as a microkernel. The operating system can also be implemented as an application program operating over a general-purpose operating system, such as UNIX™ or Windows NT™, or as a general-purpose operating system with configurable functionality, which is configured for storage applications.

As shown in FIG. 4A, the operating system 340a includes several software modules, or "layers." These layers include a storage manager 400a. The storage manager 400 is application-layer software imposes a structure on internal mass storage devices 350a (and any NAS storage devices managed by the target storage controller 230) and services transaction requests directed to the target storage system 210. Logically "under" the storage manager 400a, the operating system 340a also includes a network access layer 405a and an associated media access layer 410a, to allow the target storage controller 230 to communicate over the network 220 (e.g., with the proxy initiator 200). The network access layers 405a and 405b, as shown in FIGS. 4A and 4B respectively, implement one or more of various higher-level network protocols, such as Network File System (NFS), Common Internet File System (CIFS), Hypertext Transfer Protocol (HTTP) and/or Transmission Control Protocol/Internet Protocol (TCP/IP). The media access layers 410a and 410b, as shown in FIGS. 4A and 4B respectively, includes one or more drivers which implement one or more lower-level protocols to communicate over the network, such as Ethernet, Fibre Channel or iSCSI.

The operating system 340a also includes a storage access layer 420 and an associated storage driver layer 425, to allow the target storage controller 230 to communicate with the target storage system 210. The storage access layer 420 implements a higher-level disk storage protocol, such as RAID, while the storage driver layer 425 implements a lower-level storage device access protocol, such as FCP or SCSI. Also shown in FIG. 4A is the path 430a of data flow, through the operating system 340a, associated with various types of transactions processed by the target storage controller 230.

As shown in FIG. 4B, the operating system 340b includes several software layers, including a storage manager 400b. The storage manager 400b is application-layer software that services transaction requests directed to the target storage controller 230. In some embodiments, the storage manager 400b imposes a structure on internal mass storage devices 350b (and any NAS storage devices managed by the proxy initiator 200). The operating system 340b also includes a network access layer 405b and an associated media access layer 410b, to allow the proxy initiator 200 to communicate over the network 220 (e.g., with the target storage controller 230). In some embodiments, the proxy initiator 200 (and each host 205) includes an iSCSI driver 415, which enables the proxy initiator 200 (and each host 205) to generate SCSI commands and transport them over an IP-based network, such as network 220. From the perspective of operating system 340b, the iSCSI driver 415 appears to be a SCSI driver for a peripheral channel in the device.

The iSCSI driver 415 introduced herein includes an option to enable use of a proxy initiator ("USE_PROXY"). Note, however, that the current iSCSI implementation does not include a USE_PROXY option. As introduced herein, the iSCSI protocol is extended to include this option. This may be accomplished, for example, by specifying a globally unique IP address of the proxy initiator 200 in the iSCSI initiator configuration file of a host 205 or by a command line interface. When USE_PROXY is enabled, the iSCSI driver 415 sends its iSCSI PDUs (requests) to the proxy initiator 200, which forwards or sends them on to the target storage controller 230 for processing. When this option is disabled, the iSCSI driver 415 forwards its iSCSI PDUs (requests) directly to the target storage system 210 via the target storage controller 230, and not through the proxy initiator 200. In some embodiments, the option is enabled for each host 205 and not the proxy initiator 200. Also shown in FIG. 4B is the path 430b of data flow, through the operating system 340b, associated with various types of transactions processed by the proxy initiator 200.

The operating system 340b of proxy initiator 200 also includes an iSCSI proxy daemon 435 logically on top of the storage manager 400. A daemon is a computer program that runs as a background process. The iSCSI proxy daemon 435 listens to a particular TCP port number to which the hosts 205 send the datagrams when USE_PROXY option is enabled. In some embodiments, this port number is a default port number for the hosts 205 to communicate with the proxy initiator 200. When the proxy initiator 200 receives one or more iSCSI PDUs, the iSCSI daemon 435 performs Network Address Translation (NAT) to enable the hosts 205 to access the target data system 210 over the network 220 using a single globally unique public IP address. Note, however, that the iSCSI daemon 435 does not have to be implemented by the proxy initiator 200. For example, in some embodiments, the daemon is implemented in a device which does not include iSCSI driver 415, and therefore cannot encapsulate SCSI block requests within IP packets. In such embodiments, similar to proxy initiator 200, the device receives the iSCSI PDUs and performs NAT to enable the hosts 205 to access the target data system 210 over the network 220 using a single public IP address.

Figure 5:
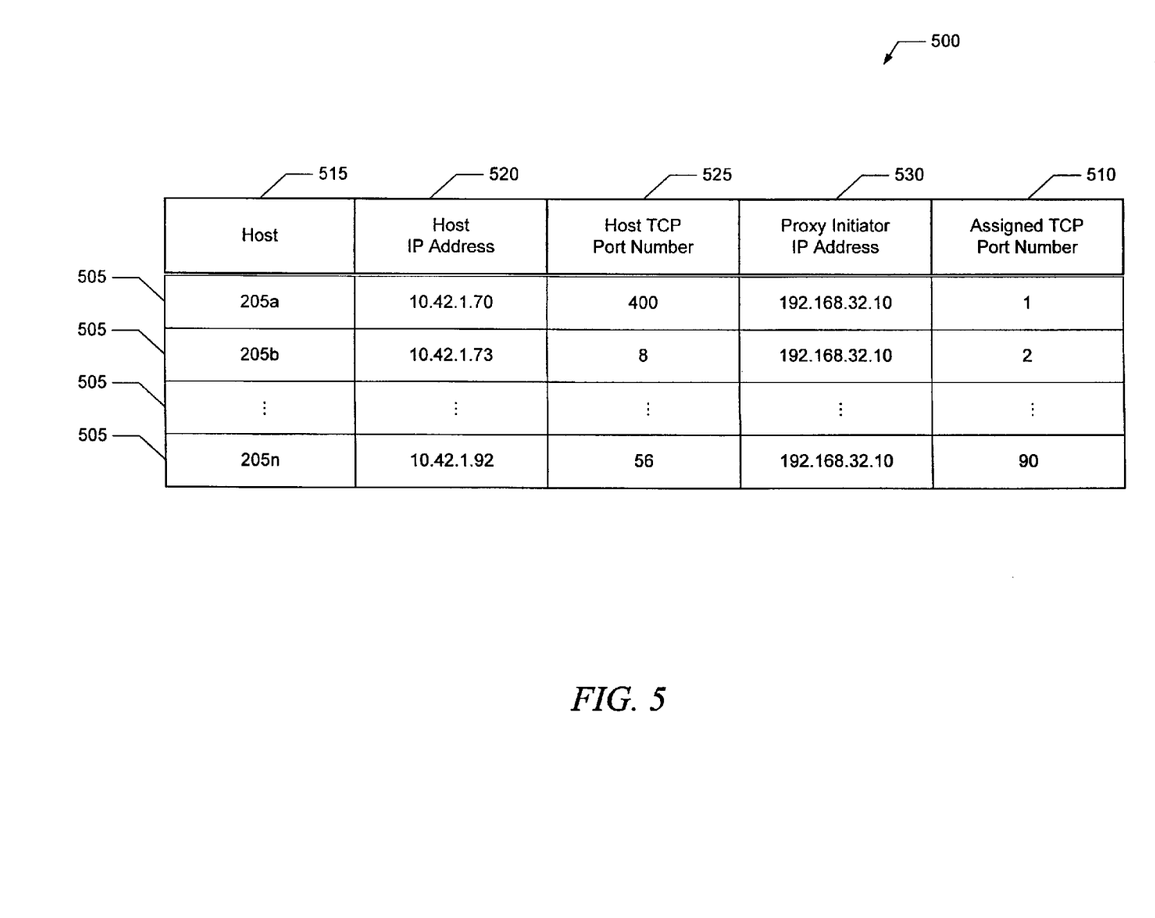
FIG. 5 is an example of a Network Address Translation (NAT) table maintained by the facility.

FIG. 5 is an example of a Network Address Translation (NAT) table 500 maintained by the facility. The NAT table includes a number of NAT entries 505 corresponding to the hosts 205. Each NAT entry 505 includes a number of fields which contain the translation information necessary to determine the destination host when an iSCSI response is received from the target storage system 210 (e.g., the original socket information of host 205). For example, each NAT entry 505 includes an assigned TCP port number field 510 used to uniquely identify a host 205 for which an iSCSI response has been received. Each NAT entry 505 includes a host field 515 that may also be used as an index into the NAT table 500. Socket information, such as a host's IP address and TCP port number, is also included within each entry 505 in fields 520 and 525, respectively. Each NAT entry 505 may also include the proxy initiator IP address field 530. NAT entries 505 may include other information fields not mentioned here.

Figure 6:
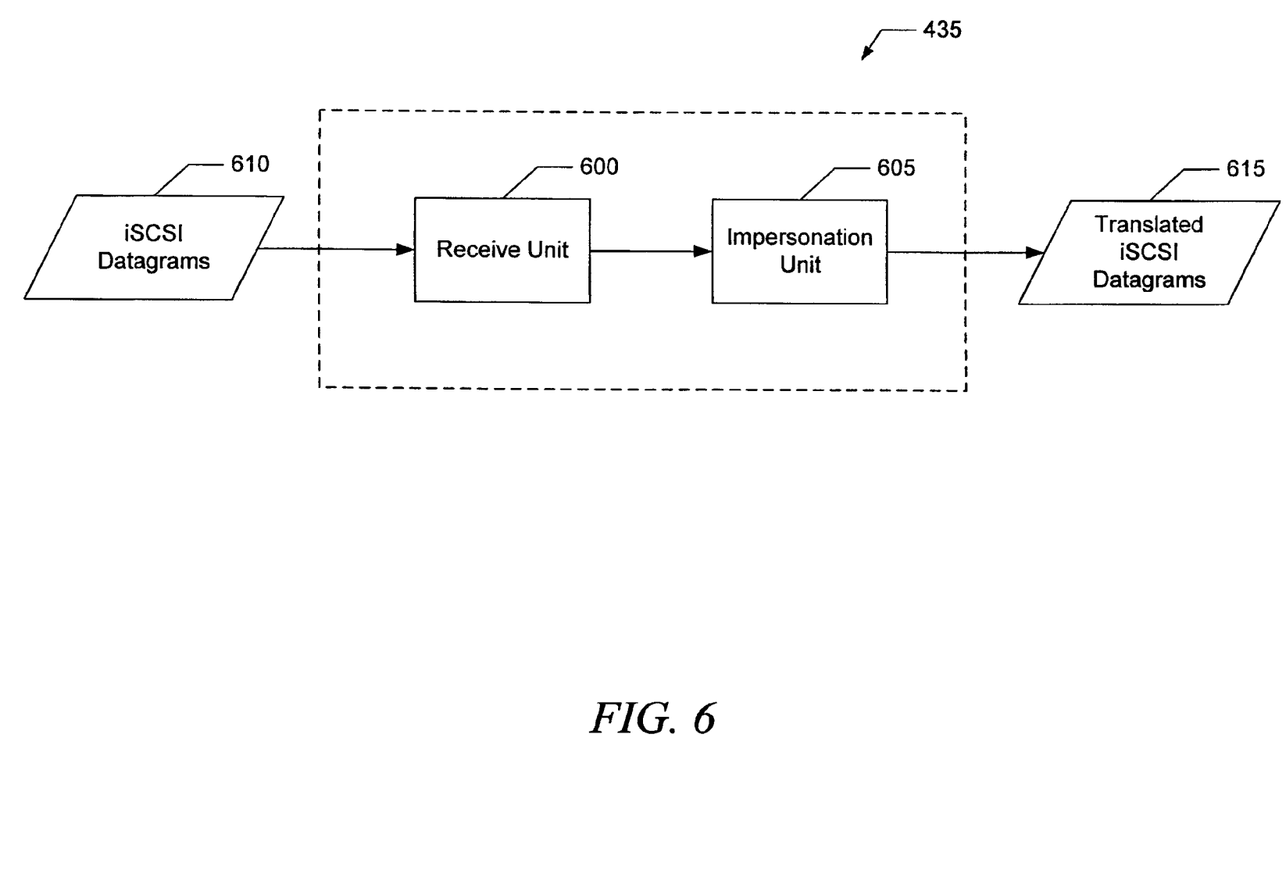
FIG. 6 illustrates the relevant functional elements of an iSCSI proxy daemon, according to some embodiments.

FIG. 6 illustrates the relevant functional elements of the iSCSI proxy daemon 435 of the operating system 340b, according to some embodiments. The iSCSI daemon 435 includes a receive unit 600 and an impersonation unit 605. The receive unit 600 receives iSCSI PDUs 610 from a numbers of hosts 205. Each iSCSI PDU 610 includes one or more encapsulated SCSI commands, a local IP address corresponding to the host 205 from which the iSCSI PDU 610 was received, and an indication of a target storage controller 230 to which the IP packet is addressed. The impersonation unit 605 maps the local IP address of the host 205 to a globally unique IP address associated with the proxy initiator 200, and sends the translated iSCSI PDU 615 to the target storage controller 230 to which the iSCSI PDU 610 is addressed.

Figure 7:
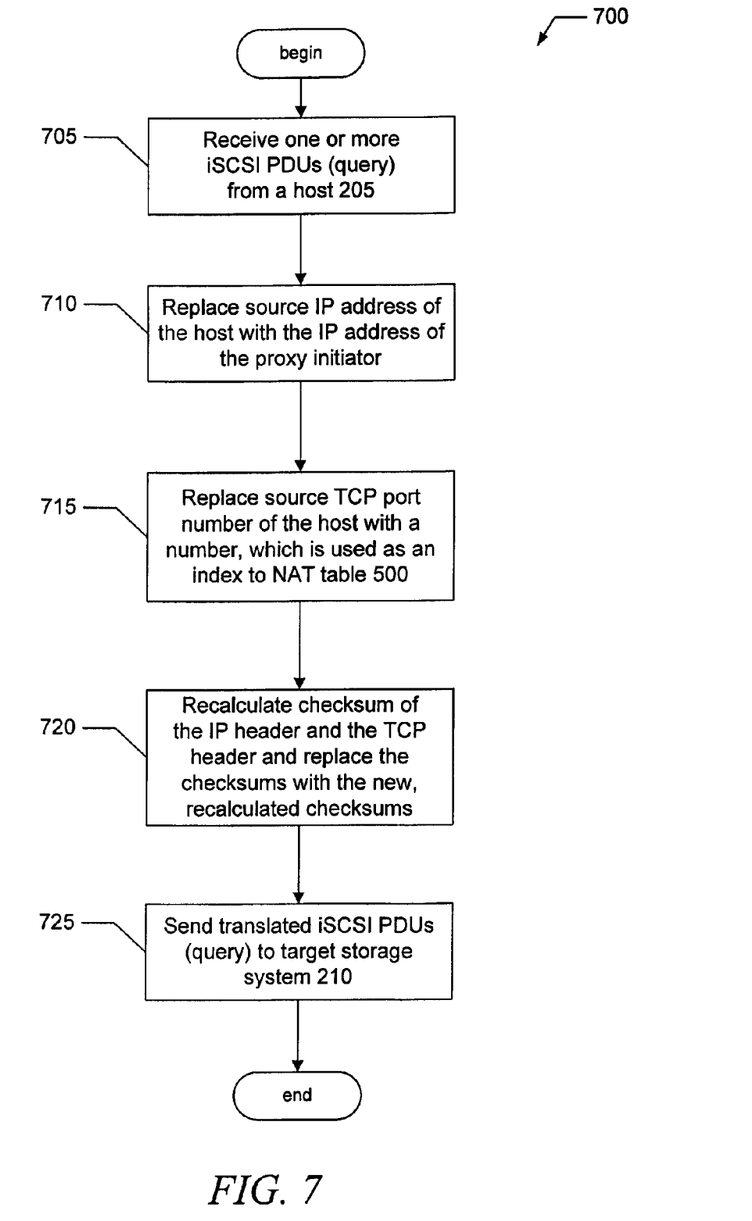
FIG. 7 is a flow chart of process performed by the facility to manage an iSCSI request received from a host, in some embodiments.

Refer now to FIG. 7, which is a flow chart of a process 700 performed by the facility (e.g., the proxy initiator 200) to manage iSCSI requests generated by the hosts 205. Initially, at 705, the facility receives one or more iSCSI PDUs corresponding to a request (e.g., one or more SCSI commands) executed by a host 205. At 710, the facility replaces the source IP address 520 of the host 205 with the IP address 530 of the proxy initiator 200. Next, at 715, the facility replaces the TCP port number 525 of the host 205 with an assigned TCP port number 510 that is used as an index into the NAT table 500. The assigned port number 510 can be used to uniquely identify the host 205 for which an iSCSI response has been received. At 720, the facility recalculates the checksum for the IP Header and the TCP header of the iSCSI PDU and puts the new checksums in the appropriate fields. A checksum is a value that is used to check the integrity of data (such as an iSCSI datagram). Typically, checksums are generated by a function (e.g., a one-way hash function) that is dependent upon the data or a portion of the data under consideration. If the two checksums are identical, then the data has not changed. If the two checksums are different, then the data has been altered. At 725, the facility sends the translated iSCSI PDUs (request) to the target storage controller 230, and the process ends. Thus, proxy initiator 200 is used to impersonate the identity of the host 205 executing the iSCSI request.

Figure 8:
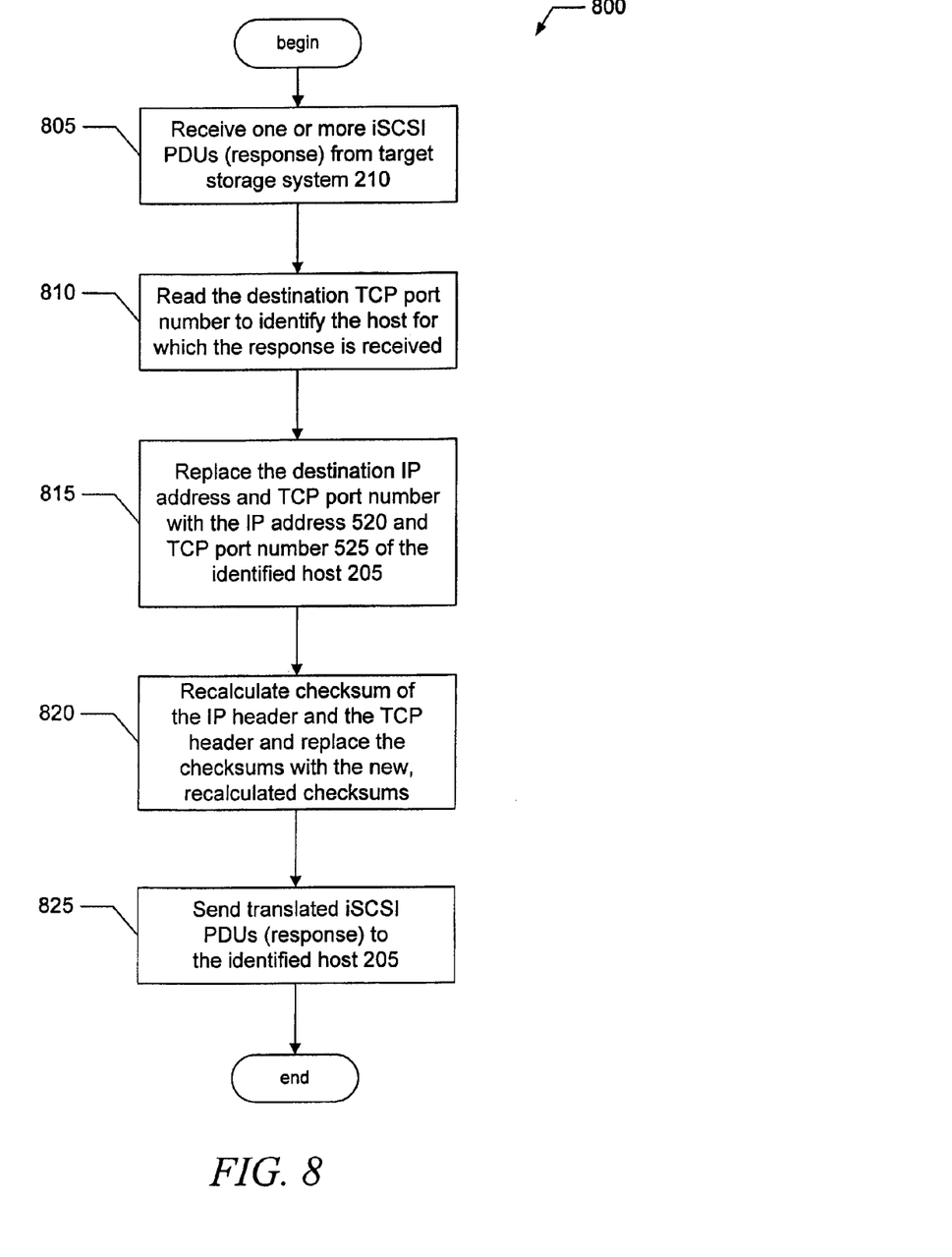
FIG. 8 is a flow chart of a process performed by the facility to manage iSCSI responses received from a target storage system, in some embodiments.

The target storage device processes the iSCSI request, and typically sends an "iSCSI response" in the form of one or more iSCSI PDUs. Because the iSCSI request included the IP address 530 of the proxy initiator 200, the iSCSI response is returned to the proxy initiator 200. Also, because iSCSI request included an assigned port number 510 as the source TCP port number, the assigned port number 510 is used as the destination TCP port number of the iSCSI response. Refer now to FIG. 8, which is a flow chart of a process 800 performed by the facility to manage iSCSI responses received from the target storage controller 230. Initially, at 805, the facility receives one or more iSCSI PDUs representing an iSCSI response that corresponds to an iSCSI request executed by a host 205. At 810, the facility determines the host 205 for which the iSCSI response is received based on the TCP port number of the iSCSI response, which corresponds to an assigned TCP port number 510 that uniquely identifies a particular host 205. Next, at 815, the facility replaces the destination IP address and TCP port number of the iSCSI PDUs with the IP address 520 and TCP port number 525 of the host 205 identified at 810. Then, at 820, the facility recalculates the checksum for the IP Header and the TCP header of the iSCSI PDUs and puts the new checksums in the appropriate fields. At 825, the facility forwards the translated iSCSI PDUs (response) to the host 205 identified at 810, and the process ends. The proxy initiator 200 is therefore transparent to the host 205 that receives the incoming iSCSI PDUs (response).

Those skilled in the art will appreciated that the blocks shown in FIGS. 7 and 8 may be altered in a variety of ways. For example, the order of certain blocks may be rearranged; certain substeps may be performed in parallel; certain shown blocks may be omitted; or other blocks may be included; etc.

Thus, a facility for impersonating the identity and number of hosts connecting to a target storage system has been described. The facility significantly reduces the number of public IP addresses necessary to access a target storage system of a pure IP-based SAN. The facility also significantly reduces the cost of connection-based licensing often implemented by storage service providers. The facility introduced herein further provides a centralized mechanism for monitoring incoming and outgoing iSCSI PDUs. Importantly, because any host can act as a proxy initiator, no additional or specialized hardware is required to implement the facility introduced herein.

Note that references throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics being referred to may be combined as suitable in one or more embodiments of the invention, as will be recognized by those of ordinary skill in the art.

Although the present invention has been described with reference to specific exemplary embodiments, it will be recognized that the invention is not limited to the embodiments described, but can be practiced with modification and alteration within the spirit and scope of the appended claims. For example, it will be appreciated that the described proxy initiator may also be separated from a particular organization and offered as a service to one or more organizations. Accordingly, the specification and drawings are to be regarded in an illustrative sense rather than a restrictive sense.

I claim:

1. An apparatus comprising:
   a receive unit to receive IP packets from a plurality of hosts directed to an IP-based SAN, wherein each received IP packet includes an encapsulated SCSI command, a local IP address corresponding to a host from which the IP packet was received, and a storage device identifier of a storage device within the IP-based SAN to which the IP packet is addressed; and
   an impersonation unit to, for each received IP packet:
      map the local IP address of the received IP packet to a single globally unique IP address of the apparatus;
      modify the received IP packet by removing the local IP address; and
      send the modified IP packet to the storage device to which the IP packet is addressed;
   wherein each modified IP packet sent by the apparatus to the IP-based SAN includes the storage device identifier and includes the single globally unique IP address that identifies the apparatus as the host from which the IP packet is sent.

2. The apparatus of claim 1 further comprising a response unit to receive a response from the storage device to which the IP packet was addressed, wherein the response includes an indication of the storage device and the single globally unique IP address to which the response is addressed; and
   wherein the impersonation unit maps the single globally unique IP address to the local IP address and sends the response to the host corresponding to the local IP address; and
   wherein the apparatus is transparent to the host.

3. The apparatus of claim 2 wherein the impersonation unit performs network address translation (NAT) to map between the local IP address and the single globally unique IP address.

4. The apparatus of claim 3 further comprising a NAT table, wherein the NAT table includes a plurality of entries, each entry corresponding to one of the plurality of hosts, each entry including a local IP address of the corresponding host, a TCP port number of the corresponding host, and an assigned TCP port number of the corresponding host.

5. The apparatus of claim 1 further comprising a report generator to generate a human-readable report describing the received IP packets.

6. The apparatus of claim 5 wherein the report includes a first indication of the host from which each IP packet was received and a second indication of the storage device to which each IP packet was addressed.

7. The apparatus of claim 5 wherein the report is generated periodically and describes a periodic interval for which it is generated.

8. The apparatus of claim 5 wherein the report is generated in response to an event.

9. The apparatus of claim 1 wherein the apparatus is one of the plurality of hosts.

10. The apparatus of claim 9 further comprising an iSCSI daemon.

11. The apparatus of claim 1 wherein the apparatus does not include an iSCSI driver.

12. The apparatus of claim 1 further comprising an iSCSI initiator to generate a SCSI command directed to a storage device of the IP-based SAN and encapsulate the generated SCSI command in one or more IP packets, wherein the one or more IP packets include: the SCSI command, an apparatus identity, and an indication of the storage device to which the SCSI command is addressed; and wherein the impersonation unit sends the one or more IP packets to the indicated storage device without mapping the apparatus identity to the single globally unique IP address.

13. The apparatus of claim 12 wherein the apparatus identity is the same as the single globally unique IP address.

14. The apparatus of claim 12 wherein the iSCSI initiator is implemented in an iSCSI driver that includes a USE_PROXY option, and wherein the USE_PROXY option is disabled.

15. A method comprising:

receiving, at a proxy device, messages from a plurality of host devices directed to at least one target device within an IP-based storage area network, wherein each received message includes a SCSI command, a host identity corresponding to a host device from which the message was received, and a target identifier of a target device within the IP-based storage network to which the message is directed; and for each received message:
mapping the host identity of each received message to a single globally unique IP address corresponding to the proxy device;
removing the host identity from the received message; and
sending the message from the proxy device to the target device;

wherein messages sent by the proxy device to the IP-based storage area network include the target identifier and include the single globally unique IP address that identifies the proxy device as the host device from which the message is sent.

16. The method of claim 15 further comprising, in response to sending the message to the target device, receiving at the proxy device a response from the target device, wherein the response includes a target identity corresponding to the target device and the single globally unique IP address to which the response is directed;

mapping the single globally unique IP address to the host identity; and sending the response from the proxy device to the host device corresponding to the host identity.

17. The method of claim 15 wherein the proxy device is one of the plurality of host devices.

18. The method of claim 17 wherein the proxy device includes an iSCSI daemon.

19. The method of claim 15 wherein the proxy device does not include an iSCSI driver.

20. The method of claim 15 wherein the method is performed by the proxy device.

21. The method of claim 20 further comprising:

generating a SCSI command directed to the at least one target device within the IP-based storage area network;

generating a message that includes the SCSI command, a proxy identity, and an indication of the at least one target device to which the SCSI command is directed; and sending the generated message to the at least one target device without mapping the proxy identity to the single globally unique IP address.

22. The method of claim 15 wherein each received message is an iSCSI datagram.

23. The method of claim 15 further comprising maintaining a log of the received messages; and in response to receiving a reporting request, generating a human-readable report based on the maintained log.

24. The method of claim 23 wherein the log includes, for each received message, a first indication of the host device from which the message was received and a second indication of the target device to which the message was directed.

* * * * *

UNITED STATES PATENT AND TRADEMARK OFFICE
CERTIFICATE OF CORRECTION

| | | |
|---|---|---|
| PATENT NO. | : 8,359,379 B1 | Page 1 of 1 |
| APPLICATION NO. | : 12/112745 | |
| DATED | : January 22, 2013 | |
| INVENTOR(S) | : Sen | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1178 days.

Signed and Sealed this
Eleventh Day of November, 2014

Michelle K. Lee
*Deputy Director of the United States Patent and Trademark Office*